United States Patent
Lewis et al.

(10) Patent No.: US 8,781,951 B2
(45) Date of Patent: Jul. 15, 2014

(54) METHOD AND SYSTEM FOR PROVIDING FINANCING

(75) Inventors: Mark K. Lewis, Atlanta, GA (US); Ricky Loftsgard, Clive, IA (US); Kasra Naderi, Atlanta, GA (US); Richard C. Potter, Fayetteville, GA (US)

(73) Assignee: CCIP Corp., Henderson, NV (US)

( * ) Notice: Subject to any disclaimer, the term of this patent is extended or adjusted under 35 U.S.C. 154(b) by 1099 days.

(21) Appl. No.: 11/615,549

(22) Filed: Dec. 22, 2006

(65) Prior Publication Data

US 2008/0154766 A1   Jun. 26, 2008

(51) Int. Cl.
*G06Q 40/00* (2012.01)
(52) U.S. Cl.
USPC .............................................. 705/38; 705/35
(58) Field of Classification Search
USPC ......................................................... 705/38
See application file for complete search history.

(56) References Cited

U.S. PATENT DOCUMENTS

| | | | | |
|---|---|---|---|---|
| 6,088,686 | A * | 7/2000 | Walker et al. | 705/38 |
| 7,444,301 | B2 * | 10/2008 | Conklin et al. | 705/37 |
| 2002/0069160 | A1 * | 6/2002 | Olin | 705/38 |
| 2003/0144950 | A1 * | 7/2003 | O'Brien et al. | 705/38 |
| 2005/0273406 | A1 * | 12/2005 | Lebda et al. | 705/35 |
| 2007/0142925 | A1 * | 6/2007 | Heinzmann et al. | 700/1 |
| 2007/0192237 | A1 * | 8/2007 | Duoos et al. | 705/38 |
| 2008/0126267 | A1 * | 5/2008 | Rosen et al. | 705/36 R |
| 2008/0249809 | A1 * | 10/2008 | Rosen et al. | 705/4 |

* cited by examiner

*Primary Examiner* — Kirsten Apple
(74) *Attorney, Agent, or Firm* — Philip H. Burns, IV

(57) ABSTRACT

Methods for financing dealer debt instruments for customers of a dealer are disclosed. One method, among others, an underwriter system that finances a dealer debt instrument based upon at least one of customer information, product information, and transaction information for the dealer debt instrument. The underwriter system may calculate an initial purchase offer, and then adjust the initial purchase offer based at least upon at least one of product information and transaction information. In some situations, the underwriter system may provide a dealer with multiple purchase offers for one debt instrument.

12 Claims, 7 Drawing Sheets

METHOD AND SYSTEM FOR PROVIDING FINANCING

BACKGROUND OF THE INVENTION

Since 1985, the sub-prime automotive finance industry has risen and fallen due to a lack of a disciplined credit policy among publicly traded finance companies. The model that survived the turbulent times of the mid to late 1990's was the basic buy here/pay here self-financing model. The success of this model is largely attributed to the dealer's concern in structuring the right deal to mitigate risk and improve performance. Therefore, the dealer became more focused on deal structure and customer attributes in an effort to minimize risk and increase near term cash flow. As finance companies began to fail in the late 90's, those dealers who had largely abandoned this strategy and moved upstream in credit quality and product, migrated back downstream and regained the discipline that was lost in the overabundance of lending, or simply did not survive.

The traditional concept of considering the "F & I" department as a major profit center moved the emphasis towards upfront funding and ancillary product sales for most franchise and independent auto dealerships. This movement was detrimental to the sub-prime industry, and can be cited as being a major contributing factor to the downfall of the financial institutions that focused on sub-prime during the mid 90's. With credit quality in the country not improving, there still exists a very large (in fact growing) industry for higher risk, sub-prime auto financing.

Today the majority of dealers have two key elements that can allow them to capitalize on this opportunity: 1) access to a growing number of consumers with questionable credit history, and 2) access to trade-in vehicles at a reasonable acquisition price. However, most dealers are not capable of entering this market due to the lack of certain resources vital to making this type of program a success. Those resources include: the ability to raise and maintain capital to run this product, access to a servicing platform sufficient to provide customer service and collections for this customer type, and a lack of historical data to support underwriting and making credit worthiness decisions.

Thus, a heretofore unaddressed need exists in the industry for, among other things, a financial product that allows dealers who do not have the time or the resources necessary to start or grow their own "self-financing" program to enter or expand their penetration in the sub-prime financing industry.

SUMMARY OF THE INVENTION

Embodiments of the present invention can be viewed as underwriting customer debt instruments. In this regard, one embodiment of such a method, among others, can be broadly summarized by the following steps: receiving from the dealer a credit application for a customer to purchase a product sold by the dealer, the credit application including customer information, product information, and transaction information; obtaining a credit report on the customer; determining whether to purchase at least a portion of the debt instrument based upon the credit report of the customer; and responsive to determining to purchase at least a portion of the debt instrument, further including the steps of: calculating an initial purchase offer based on the credit report of the customer; adjusting the initial purchase offer using at least one of the product information and the transaction information; determining whether an index associated with the adjusted purchase offer falls within a predefined range; and responsive to the index falling within the predefined range, providing the dealer with the adjusted purchase offer.

Another embodiment can be broadly summarized by the following steps: receiving from a dealer an offer to sell a debt instrument, wherein the debt instrument is the method used by a customer to purchase a product sold by the dealer; determining whether to purchase at least a portion of the debt instrument based upon a credit report for the customer; determining an initial purchase offer score based upon the credit report for the customer; determining a second purchase offer score based upon at least one of product information and transaction information; determining whether the second purchase offer score is within an acceptable range of scores; and providing the dealer with a purchase offer for at least a portion of the debt instrument if, and only if, the second purchase offer score is within the acceptable range of scores.

Other methods, features, and advantages of the present invention will be or become apparent to one with skill in the art upon examination of the following drawings and detailed description. It is intended that all such additional methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Embodiments of the present invention are directed towards moving the buyout of a debt instrument by an underwriter right up to the point-of-sale. In general, embodiments of the present invention enable a level of involvement by a financing company during the negotiation process between a potential purchaser and the seller. More specifically, in one embodiment of the invention directed towards the automotive industry, a customer and a dealer enter into discussions for the purchase of a vehicle. As the dealer and customer reach a point of agreement, the dealer logs onto a system incorporating aspects of the present invention to obtain financing options. Once logged into the system, the dealer enters three types of information. The information entered describes various aspects pertaining to the structure of the deal, including the collateral the capacity or basic qualifications of the customer (such as demographic information pertaining to the customer) and the credit rating of the customer. The capacity or basic qualifications of the customer includes a variety of information including, but not limited to the living and work history of the customer, length of time at current job and residence, financial situation, gross income, current payments ratio to income, location, frequency of payments, payment methods, use of starter interrupt devices, whether the account is a joint or individual account, whether ACH transfers are enabled or available, etc. All of these elements, as well as other elements define the capacity of the customer. This information is used to define a baseline offer that is adjusted upwards or downwards based on the collateral and the credit worthiness of the customer. Thus, if the customer satisfactorily meets the minimum capacity requirements, they will get an offer but, the offer will be further adjusted based on other information.

The collateral focuses on the vehicle, including the make, model, mileage, history, condition, etc. The credit worthiness of the customer is determined using a proprietary scoring technique, a commercially available technique, or a combination of both. Using this information, the system then presents multiple offerings to the dealer, three offers in one embodiment, that vary based on the percentage of the loan that will be advanced to the dealer and the share of the future payments that may be given to the dealers. The dealer then has the opportunity to review these offers and select the offer that is desired for the particular transaction.

Advantageously, embodiments of the present invention thus provide multiple offers to a seller for the financing of a transaction, implement a payment sharing program such that the financer only buys a portion of the loan and, on top of this no fees are accessed for the financial instrument.

Figure 1:
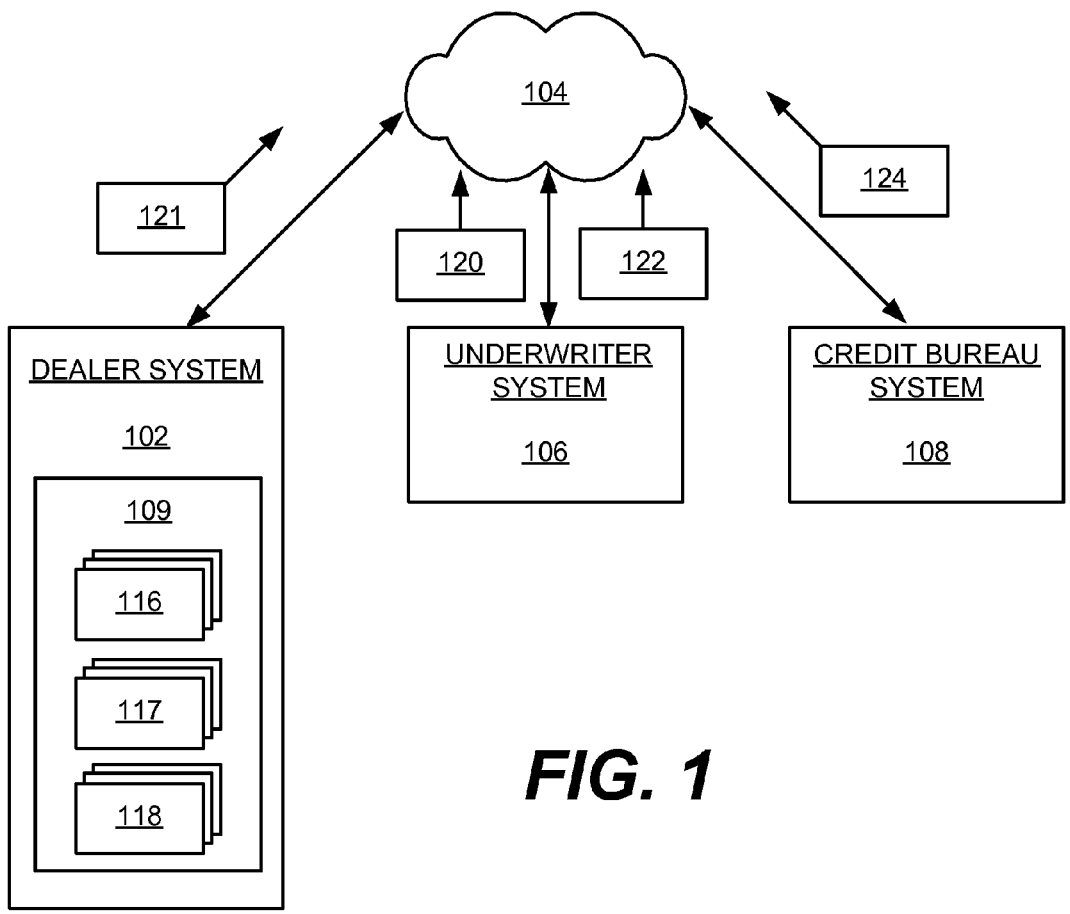
FIG. 1 block diagram illustrating one potential environment for embodiments of the present invention.

FIG. 1 is a block diagram illustrating one potential environment for embodiments of the present invention. The illustrated environment includes a connected system for a dealer, credit bureau, and an underwriter. The dealer system 102 is connected to an underwriter system 106 via a network 104, and the underwriter system 106 is in communication with a credit bureau system 108 via the network 104. The network 104 may be the internet or other network such as a telephone network. In some embodiments, the dealer system 102 and underwriter system 106 may be in direct communication. Similarly, the underwriter system 106 may be in direct communication with the credit bureau system 108.

In some embodiments, the dealer system 102 may be a computer system having the functionality for, among other things, communicating over the network 104. In other embodiments, the dealer system 102 may be comprised of network communication devices such as terminals. In other embodiments, the dealer system may be comprised of one or more computer servers with one or more terminals or personal computers networked to the one or more computer servers.

Among other things, the dealer system 102 may be configured to communicate with the network 104, receive input from a dealer 110, and manage transactions and financial accounts, which may be embodied in financial records 109. Among other things, the financial records 109 may include unapproved credit applications 116, newly approved debt instruments 117, and aged debt instruments 118. For the purposes of this disclosure an aged debt instrument is a debt instrument having a repayment history, i.e., the debt instrument was approved some time in the past such that one or more payment due dates have occurred some time in the past. For the purposes of this disclosure, a newly approved debt instrument is a debt instrument that has been approved but for which there is not yet a repayment history, i.e., all of the payment due dates for the debt instrument are still in the future. For the purposes of this disclosure, an unapproved credit application is an application for a credit application that has not yet been approved. Typically, each one of the unapproved credit applications 116, newly approved debt instruments 117, and the aged debt instruments 118, will include information such as, but not limited to, customer information, product information, and transaction information.

The dealer 110 has an inventory of products 112 that the dealer sells to customers 114. For the sake of clarity, the dealer 110 will be described below as a car dealer, and the products 112 will be described below as cars. It should be appreciated that such description is not intended as a limitation and is provided to illustrate one embodiment.

As is well known, many customers 114 either cannot afford to pay cash for a car 112 or may decide not to pay cash when purchasing a car 112. Consequently, the dealer 110 may provide prospective customers with financing to enable the prospective customers to purchase one of the dealer's cars. When a customer 114 applies for financing, the dealer 110 uses the dealer system 102 to gather and enter information for obtaining or qualifying for financing. The credit application includes a variety of information fields for providing customer information, product information, credit information and transaction information. The credit application is stored in the dealer system 102 as an unapproved credit application 116. In some situations, the dealer 110 may decide to approve an unapproved credit application 116 and decide to underwrite the debt instrument created from the credit application. In other situations, the dealer may decide to have the underwriter system 106 decide whether to approve or disapprove the as of now unapproved credit application, and if it is approved, then the underwriter system 106 may underwrite the debt instrument created from the newly approved credit application. After an unapproved credit application has been approved by either the dealer or the underwriter system, the unapproved credit application becomes a newly approved debt instrument. The newly approved debt instrument remains in that status until a payment history for the debt instrument has been created. The payment history for the debt instrument begins when the customer starts to make payments or on the first payment date, which ever comes first. After a payment history for the debt instrument has been generated, the status of the debt instrument changes to an aged debt instrument. Typically, aged debt instruments have payment histories of approximately 6 or more months or 6 or more payment periods.

Frequently, the dealer 110 is not in the primary business of underwriting debt instruments. Consequently, the dealer 110 may not want to approve and underwrite debt instruments nor retain the debt instrument on newly approved debt instruments and aged debt instruments. Thus, the dealer 110 may decide to sell one or more of the debt instruments, which includes newly approved debt instruments and aged debt instruments, to the underwriter system 106. The dealer 110 may also decide to have the underwriter system 106 decide whether to approve an unapproved credit application, and then if the underwriter system 106 approves the unapproved credit application, the dealer may decide to sell the debt instrument created from the credit application.

So as to sell a debt instrument—a newly approved debt instrument, an aged debt instrument, or a debt instrument created from an unapproved credit application—the dealer system 102 provides the underwriter system with an offer-to-sell 121. The offer-to-sell 121 includes capacity or customer information, collateral or product information, and credit information. In the case of an aged debt instrument, the offer-to-sell may also include payment history for the debt instrument.

Among other things, the underwriter system 106 receives the offer-to-sell 121 from the dealer system 102. The underwriter system is configured to process each received offer-to-sell and provide the dealer system 102 with an offer-to-sell response 120. The offer-to-sell response 120 may include notification that the offer-to-sell was incomplete, e.g., if the offer-to-sell was for a debt instrument created from an unapproved credit application 116, the unapproved credit application might have been incomplete. The offer-to-sell response might include a purchase offer from the underwriter system 106. In the purchase offer, the underwriter system 106 may offer to purchase some, or all, of the debt instrument and may provide various terms for purchasing the debt instrument. In some embodiments, the underwriter system 106 may offer to purchase some or all of a debt instrument that is created from an as of yet unapproved credit application, some or all of a newly approved debt instrument, and/or some or all of an aged debt instrument. Alternatively, the offer-to-sell response might include notification that the underwriter system 106 declines to purchase the debt instrument. For example, the offer-to-sell might have been an offer to sell a debt instrument created from an as of yet unapproved credit application, and the offer-to-sell response might include notice that the underwriter system 102 refused to purchase the debt instrument generated from the as of yet unapproved credit application. Similarly, the offer-to-sell might have been an offer to sell an aged debt instrument, and the offer-to-sell response might have been a refusal to purchase the aged debt instrument. The refusal may have been based upon one or more criteria including the payment history of the aged debt instrument.

Among other things, the underwriter system 106 may parse customer information from the offer-to-sell 121 and provide portions of this customer information 122 to a credit bureau system 108.

In some embodiments, the credit bureau system 108 may be comprised of a computer system having the functionality for, among other things, communicating over the network 104, gathering information related to a person's credit history, and analyzing the gathered information to generate a credit score and/or credit report. In other embodiments, the credit bureau system 108 may be comprised of one or more computer servers and one or more databases having credit related information stored therein.

The credit bureau system 108 receives the customer information 122 and generates a credit report 124 pertaining to the customer 114. Typically, the credit report 124 may include a "credit score" such as a FICO score, created by Fair, Issacs and Company and credit history. Typically, the underwriter system will use the credit report 124 to process the offer-to-sell 121. In some embodiments, the underwriter system may simply utilize information received from the credit bureau system 108 to generate a credit score using a proprietary technique. In other embodiments, the utilization of a credit bureau system 108 may be omitted and the underwriter system may generate a credit score directly from the customer information 122 and/or other information accessible to the underwriter system.

One aspect of the present invention is that the underwriter system 106 may provide the dealer 110 with multiple purchase offers for a given offer-to-sell 121. The multiple purchase options may provide the dealer with varying degrees of risk and varying degrees of remuneration for selling a debt instrument. Normally, the greater the amount of risk that the dealer is willing to undergo, the greater the potential remuneration for the dealer. If the dealer is risk adverse, the dealer might select a purchase offer that provides for more money upfront and less money in the future. On the other hand, the dealer might select a purchase offer that has less upfront money and greater potential future return. For instance, in various embodiments of the present invention, the offers may differ based on the amount of money the underwriter will advance to the dealer and the share of the future payments that will be paid to the dealer. In one particular embodiment, the underwriter system provides three offers to the dealer with an advance rate ranging from 41% to 75% of the amount of the debt instrument with a percentage share of further payments decreasing over that same range.

It should be noted that the underwriter system 106 and the credit bureau system 108 are normally operated by independent entities. However, in some embodiments, a single entity may provide both underwriting functions and credit reporting functions.

Figure 2:
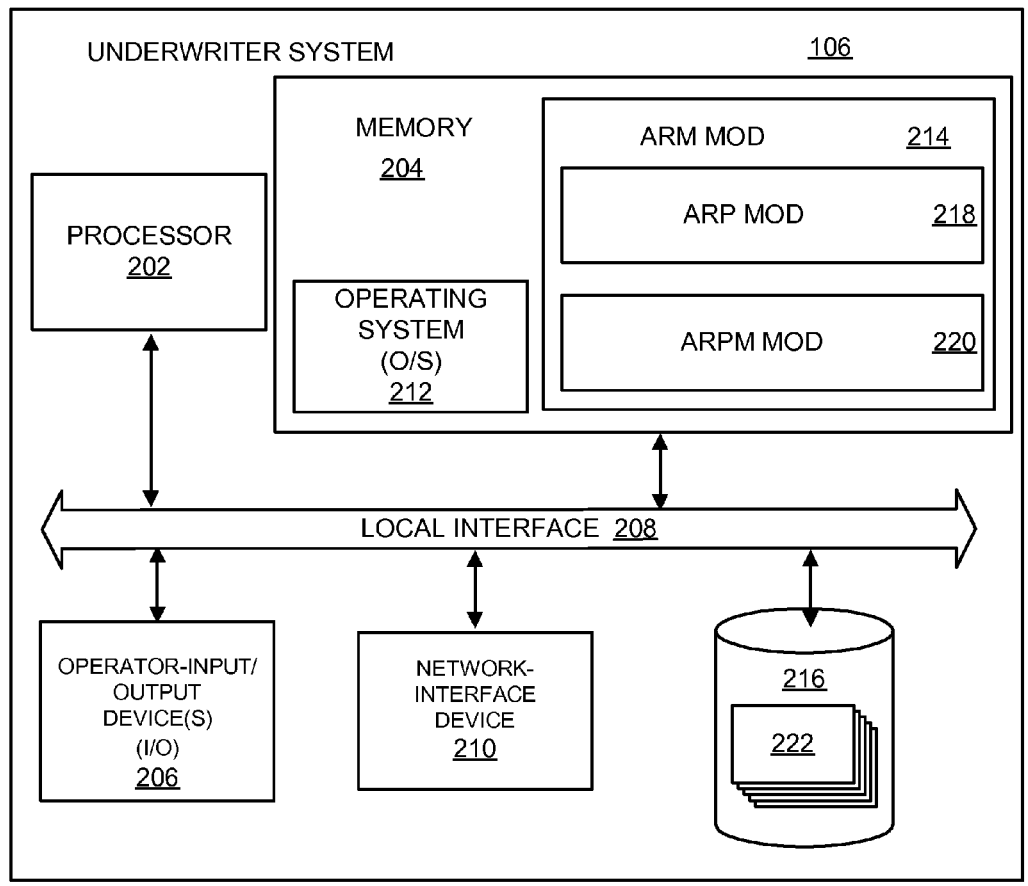
FIG. 2. is a block diagram of an underwriter system.

FIG. 2 is a schematic diagram illustrating an embodiment of the underwriter system 106 of FIG. 1. Generally, in terms of hardware architecture, as shown in FIG. 2, underwriter system 106 includes processor 202, memory 204 and one or more user input and/or output (I/O) devices 206 (or peripherals) that are communicatively coupled via a local interface 208.

The local interface 208 can be, for example but is not limited to, one or more buses or other wired or wireless connections, as is known in the art. The local interface 208 may have additional elements, which are omitted for simplicity, such as controllers, buffers (caches), drivers, repeaters, and receivers, to enable communications. Further, the local interface 208 may include address, control, and/or data connections to enable appropriate communications among the aforementioned components.

Processor 202 is a hardware device for executing software, particularly that stored in memory 204. The processor 202 can be any custom made or commercially available processor, a central processing unit (CPU), an auxiliary processor among several processors associated with the underwriter system, a semiconductor based microprocessor (in the form of a microchip or chip set), or generally any device for executing software instructions.

The memory 204 can include any one or combination of volatile memory elements (e.g., RAM, such as DRAM, SRAM, SDRAM, etc.) and nonvolatile memory elements (e.g., ROM, flash memory, etc.). Moreover, the memory 204 may incorporate electronic, magnetic, optical, and/or other types of storage media. Note that the memory 204 can have a distributed architecture, where various components are situated remote from one another, but can be accessed by the processor 202.

The user I/O devices 206 may include input devices, for example but not limited to, a keyboard, mouse, scanner, microphone, a touch sensitive display etc. Furthermore, the user I/O devices 206 may also include output devices, for example but not limited to, a printer, display, etc. I/O devices may further include devices that communicate both inputs and outputs, for instance but not limited to, a modulator/demodulator (modem; for accessing another device, system, or network), a radio frequency (RF) or other transceiver, a telephonic interface, a bridge, a router, etc. One or more of these communication devices may be included in a network interface device 210.

Software stored in memory 204 may include one or more separate programs, each one of which comprises an ordered listing of executable instructions for implementing logical functions. In the example of FIG. 2, the software in the memory 204 includes operating system 212 and account receivable manager (ARM) module 214. Among other things, operating system 212 essentially controls the execution of ARM module 214 and provides scheduling, input-output control, file and data management, memory management, and communication control and related services.

ARM module 214 may be a source program, executable program (object code), script, or any other entity comprising a set of instructions to be performed. When implemented as a source program, ARM module 214 is translated via a compiler, assembler, interpreter, or the like, which may or may not be included within the memory 204, so as to operate properly in connection with the O/S 212. Furthermore, ARM module 214 can be written in one or more object oriented programming languages, which have classes of data and methods, or procedure programming languages, which have routines, subroutines, and/or functions.

In some embodiments, the underwriter system 106 includes a database 216. The database 216 can include any one or combination of volatile memory elements (e.g., RAM, such as DRAM, SRAM, SDRAM, etc.) and nonvolatile memory elements (e.g., ROM, flash memory, etc.). Moreover, the database 216 may incorporate electronic, magnetic, optical, and/or other types of storage media. Note that the database 216 can have a distributed architecture, where various components are situated remote from one another, but can be accessed by the processor 202.

The ARM module 214 may include an account receivable purchaser (ARP) module 218 and an account receivable portfolio manager (ARPM) module 220. The ARP module 218 may be configured to receive and process, among other things, the received offer-to-sell 121. To process a given offer-to-sell 121, the ARP module 218 may, among other things, parse information such the customer information from the offer-to-sell 121 and provide the customer information 122, among other information, to the credit bureau system 108. The ARP module 218 may be configured to receive the credit report 124 from the credit bureau system 108 and further process the offer-to-sell 121 using information contained in the credit report 124. When the offer-to-sell 121 was for a newly approved debt instrument 117 or an aged debt instrument 118, further processing of the offer-to-sell 121 by the ARP module 218 may be include deciding whether or not to purchase the debt instrument based upon the credit report 124. When the offer-to-sell 121 was for an unapproved credit application 116, further processing of the offer-to-sell 121 by the ARP module 218 may be include deciding whether or not to approve the credit application and whether or not to purchase the debt instrument created from the credit application. For credit applications, the ARP module may decide whether to approve the credit application and purchase the ensuing debt instrument based upon the credit report 124.

Upon deciding to purchase a debt instrument, the ARP module 218 may generate an initial purchase offer. In one embodiment, the initial purchase offer is primarily based on the capacity information pertaining to the customer. This information is reviewed and compared against desired values to generate the initial offer. After generating an initial purchase offer, the ARP module 218 may use information included in the offer-to-sell 121 to adjust or refine the initial purchase offer and generate therefrom one or more purchase offers. In some situations, in the process of adjusting or refining the initial purchase offer, the ARP module 218 may decide not to purchase the debt instrument associated with the offer-to-sell 121. Among other things, the ARP module 218 may use product information and/or credit information to adjust the initial purchase offers. As a non-limiting example, product information may include make of car, model and trim of car, mileage of car, appraised value of car, VIN of car, color, options, etc., and credit information may include report information received from a credit bureau, a proprietarily generated credit score or a combination of both. Other information may also come into play such as the amount of down payment, number of payments and/or term of debt instrument, interest rate of debt instrument, amount of debt instrument, etc. After generating at least one purchase offer, or after having decided not to generate a purchase offer—to have decided to decline purchasing the debt instrument associated with offer-to-sell 121—the ARP module 218 may generate the credit application response 120 and provide the credit application response 120 to the dealer system 102.

Assuming that the ARP module 218 generated multiple purchase offers, the dealer 110 may use the dealer system 102 to select a particular purchase offer from the multiple purchase offers. Typically, each of the purchase offers includes purchase offer parameters, which the ARP module 218 can set. Non-limiting examples of purchase offer parameters include "advance payment" and "future payment." For the purposes of this disclosure an advance payment for a given purchase offer is defined as the amount of money that the dealer receives when the dealer sells a debt instrument, and for the purposes of this disclosure a future payment is defined as the amount of money that the dealer is projected to receive in the future. In some embodiments, the ARP module 218 may calculate offer parameters such as the advance payment and future payment in fractional terms, e.g., the fraction that the dealer receives (or is projected to receive) over a given denominator. The given denominator might be the total amount of the transaction, e.g., debt instrument amount plus down payment, or amount of the debt instrument, or the projected repayment amount, e.g., principal plus interest, or some other predefined amount. For the purposes of this disclosure, dealer advance payment rate is defined as the fraction of the advance payment offered to the dealer divided by a predefined denominator, and dealer future payment rate is fraction of the amount that the dealer is projected to receive in the future divided by a predefined denominator.

The database 216 has multiple account portfolios 222 stored therein. A single account portfolio 222 is comprised of multiple debt instruments that have been purchased by the underwriter system 106. When the underwriter system 106 purchases a debt instrument, the ARM module 218 either creates/opens an account portfolio 222 or includes the purchased debt instrument in a previously created/opened account portfolio 222.

Among other things, the ARPM module 220 is configured to open and close account portfolios 222 and manage the account portfolios 222. For a given account portfolio, managing the account portfolio may include determining weighted averages for purchase offer parameters of the debt instruments included in the given account portfolio. As non-limiting examples, the ARPM 220 may calculate a weighted advance payment rate or a weighted future payment rate. Managing a given account portfolio may also include crediting the given account portfolio with funds when a payment for a debt instrument included in the account portfolio is received, and maintaining a minimum reserve amount of cash in the given account portfolio.

Among other things, the ARPM module 220 may be configured to monitor the performance of the account portfolios 222 and to distribute funds to the dealer 110 in accordance with predetermined payout rules. Typically, the predetermined payout rules define whether the dealer is due a payout, and if so, when the payout is due and the amount of the payout. In some embodiments, the ARPM 220 may be configured to manage the account portfolios 222 such that there is a reserve amount in the account. For a given account portfolio, if the funds in the given account portfolio exceed a predetermined reserve amount, then the ARPM 220 may distribute a portion of the excess funds to the dealer. Typically, the predefined payout rules define the percentage of the excess funds that the dealer receives.

The ARPM module 220 may also be configured to monitor debt instrument accounts. In some embodiments, the ARPM module 220 may be configured to adjust a given portfolio account when a given debt instrument included in the given portfolio account becomes delinquent. The ARPM module 220 may implement predefined account management rules when adjusting the given portfolio account. The predefined account management rules may provide the dealer with the first right of refusal to handle customer repossessions and asset disposal (via auction or resell). In some embodiments, in the event that a customer defaults on his or her debt instrument, the ARPM module 220 may provide the dealer the following options:

1. Waive interest accrued on payoff balance from date of last payment;
2. Apply the reserve accumulated since the date of debt instrument on the individual asset being repossessed;
3. Allow the dealer to pay a predetermined amount to re-purchase the debt instrument, and thereby gain the right to repossess the product; and
4. Allow the dealer to re-purchase the debt instrument by paying a percentage of the amount due on the debt instrument, and thereby gaining the right to repossess the product.

It should be noted that the ARPM module 220 may be configured to close or lock an account portfolio 222 based on a variety of factors. For example, the ARPM module 220 may be configured to close or lock an account portfolio 222 based on criteria such as, but not limited to, the time of month (e.g., close or lock an account portfolio at the beginning or ending of a month) and/or capitalization (e.g., close or lock an account portfolio when the value of the underwritten debt instruments reach a predetermined value).

Once a portfolio is "closed," the ARPM module 220 may begin to create a history file and a dealer report on the account portfolio. The longer the account portfolio takes to close, the shorter the average remaining maturity. The ARPM module 220 may provide the dealer with an option to have a larger account portfolio value in an effort to simplify reporting.

The ARPM module 220 may provide a one-page portfolio summary in a "scorecard" format. This format will also provide the dealer with a graphical performance indicator as to how account portfolio is performing relative to expectation. In some embodiments, the reports may be dynamically generated, and the reports may be made available to the dealer at regular intervals via e-mail delivery or a secure web site.

Figure 3:
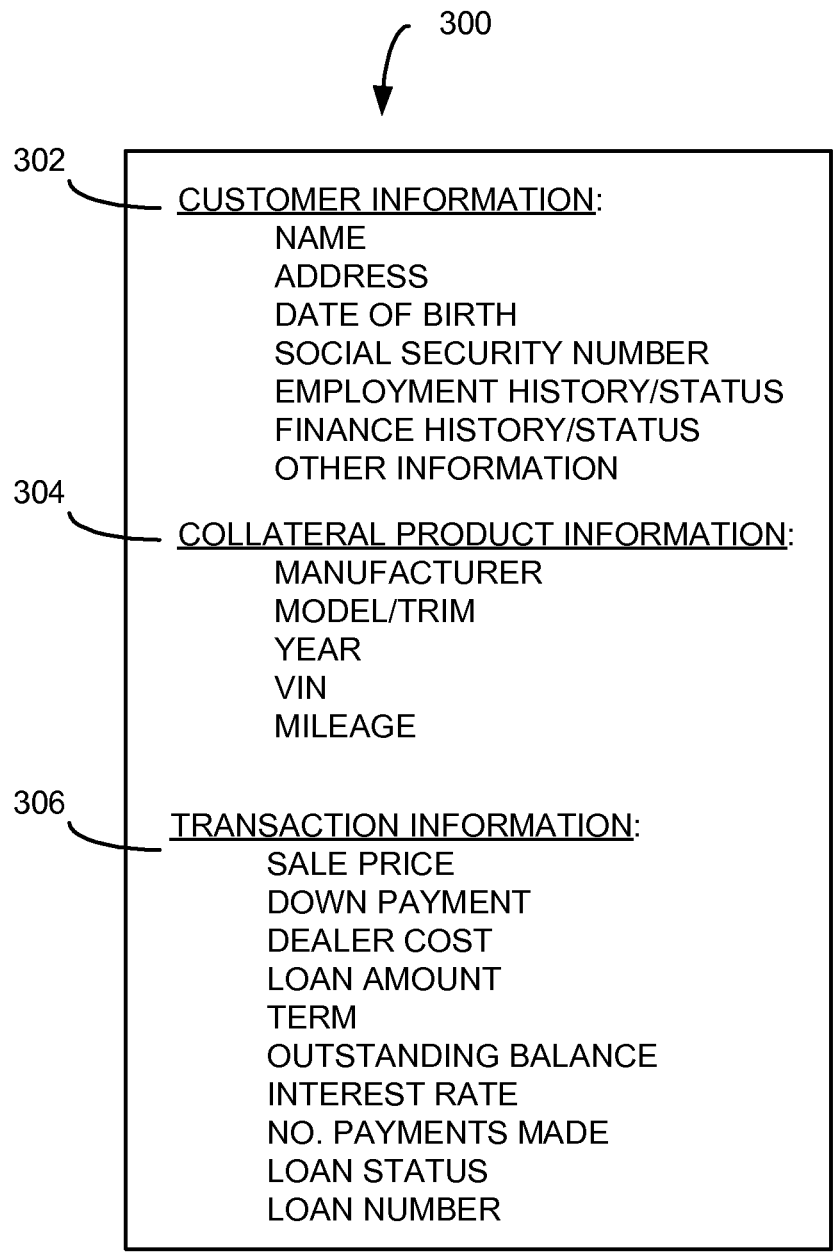
FIG. 3 is one example of a record used by the underwriter system.

FIG. 3 illustrates an example of a record 300. The record 300 includes a customer information field 302, a product information field 304, and a transaction information field 306. Non-limiting examples of content that may be carried by the customer information field 302 may include the customer's name, the customer's address, the customer's date of birth, the customer's social security number, and the customer's employment history, which may include current employer, occupation and income and previous employers, occupations, and incomes, and dates of employment, addresses of employers, length of employment, etc., finance history and status including debt to earning ratios, payment history and patterns, as well as other information. In some embodiments, the customer information field 302 may include more information or less information. For example, in one embodiment, the customer information field 302 may include, but is not limited to, other financial information such as the customer's bank account (if any), the customer's credit accounts (if any), the customer's debts (if any), the customer's obligations such as alimony/child support (if any), etc.

The collateral or product information field 304 carries information related to the product for which a customer takes out a debt instrument to purchase the product. In the case of a car, the product information field 304 may include information such as, but not limited to, the manufacturer of the car, the model and trim of the car, the year of the car, the Vehicle Identification Number of the car, the mileage of the car, etc.

The transaction information field 306 carries information related to the debt instrument used by the customer to purchase the product. In the case of a car, the transaction information field 304 may include information such as, but not limited to, the sale price of the car, the down payment by the customer, the dealer's cost of the car, the debt instrument amount, the term of the debt instrument, the outstanding balance of the debt instrument, the interest rate of the debt instrument, the number of payments made, the total number of payments over the term of the debt instrument, the number of payments still due, the status of the debt instrument—current, overdue, delinquent, paid in full, etc.—and an identifier such as a debt instrument/account number.

The information carried in the record 300 can be provided to the underwriter system 106 via the offer-to-sell 121. The ARP module 218 may use the information in the record 300 to determine whether or not to purchase a debt instrument associated with the offer-to-sell 121. If the ARP module 218 decides to purchase the debt instrument, the information in the record 300 may be used determine the terms of an offer to purchase the debt instrument or aged debt instrument.

Figure 4:
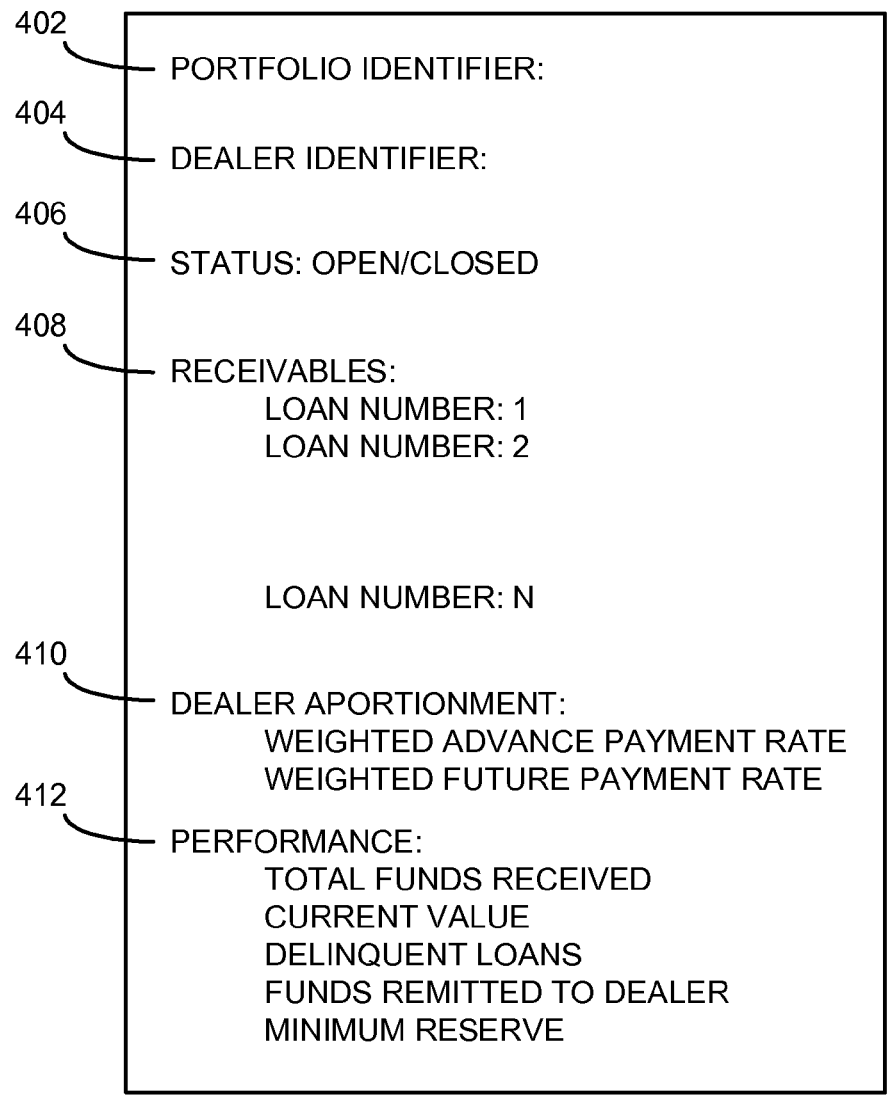
FIG. 4 is one example of a record of an account portfolio.

FIG. 4 illustrates information that may be carried in an account portfolio 222. The account portfolio 222 includes a portfolio identifier field 402, dealer identifier field 404, portfolio status field 406, receivables field 408, dealer apportionment field 410, and portfolio performance field 412. Typically, the ARPM module 220 manages multiple account portfolios 222, and each one of the multiple account portfolios 222 has a unique identifier, which is carried in the portfolio identifier field 402.

In some embodiments, the underwriter system 106 may purchase debt instruments from multiple dealers. In that case, each of the dealers is assigned an identifier. The dealer identifier field 404 carries the identifier of the dealer that is associated with the account portfolio.

The portfolio status field 406 carries the current status of the account portfolio. Among others, the current status of the account portfolio may be "open," in which case more debt instrument may be added to the account portfolio, or "closed," in which case no new debt instruments may be added to the account portfolio.

The receivables field 408 may carry information identifying each of the debt instruments that comprise the account portfolio. The dealer apportionment field 410 may carry information for determining the amount of funds to be distributed to the dealer. For example, the dealer apportionment field 410 may carry weighted averages such as, but not limited to, weighted future payment rate. The weighted future payment rate is based upon a weighted average of the future payment rates for the debt instruments that comprise the portfolio. In some embodiments, funds distributed to the dealer may be related to the weighted future payment rate.

The portfolio performance field 412 may also include information related to the performance of the portfolio. Non-limiting examples of information that may be included in the portfolio performance field 412 includes the total funds received, total outstanding balance of the portfolio, the current value of the portfolio, amount of funds remitted to the dealer, and the minimum reserve for portfolio i.e., the amount of money held in reserve by the underwriter system during the life of the portfolio account. The portfolio performance field 412 may also include information related to delinquent debt instruments.

Figure 5:
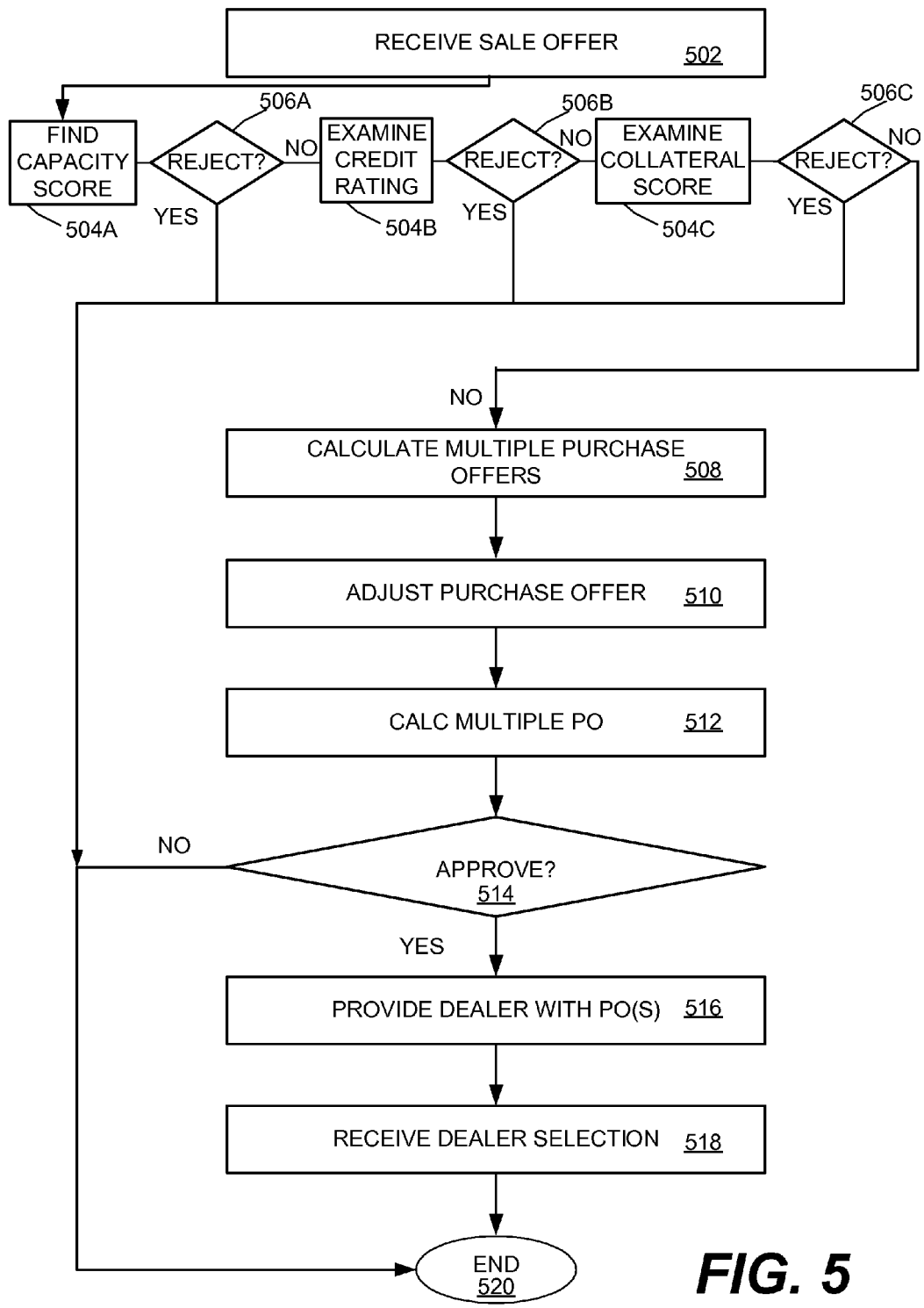
FIG. 5 is a flow chart illustrating one example of the steps taken for purchasing a debt instrument.

FIG. 5 is an one example of a flow chart illustrating steps that may be performed by the underwriter system. In step 502, the underwriter system receives an offer to sell a debt instrument. The debt instrument that is being offered for sale may be an aged debt instrument, i.e., a debt instrument with a repayment history, or a new debt instrument, which does not yet have a repayment history or has a short repayment history, or a prospective debt instrument that has not yet been approved. The offer to sell includes customer information that is parsed from the offer to sell. The customer information identifies a customer, and in step 504A, the underwriter system examines the collateral score of the customer. If the collateral score is rejected 506A, the processing ends at step 520. Otherwise, processing continues to step 504B where the credit rating for customer is examined. Typically, the underwriter system finds the customer's credit rating by providing a credit bureau with required customer information. However, in some embodiments, the underwriter system may include the capability for generating the customer's credit rating. If the credit rating is rejected 506B, the processing ends at step 520. Otherwise, processing continues at step 504C where the capacity of the customer is examined. If the capacity of the customer is insufficient to avoid rejection, processing ends at step 520. Otherwise, processing continues at step 508 where the multiple offers are calculated.

In step 510, the underwriter system adjusts the initial purchase offer. Among other things, the adjustment to the initial purchase offer may be based upon the collateral or product information and the credit score of the customer. Alternatively or in addition to, the adjustment to the initial purchase offer may be based on transaction information. In some embodiments, the adjustment to the initial purchase offer may be based on collateral or product information, the credit score and transaction information.

In step 512, the underwriter system 106 calculates multiple purchase offers based upon the adjustments to the initial purchase offer. Typically, the multiple purchase offers may have differing amounts of advance payment and/or differing amounts of future payment or future payment rates. Naturally, advance payment amounts and future payment amounts may be expressed in fractional terms of advance payment rates and future payment rates, and in that case, the multiple purchase offers may have differing advance payment rates and/or differing future payment rates. Typically, a given purchase offer may include both a future payment amount/rate (or an estimated future payment amount/rate) and an advance payment amount/rate (or estimated advance payment amount/rate, and/or other financial terms.

In step 514, the underwriter system 106 determines whether one or more, or all, of the multiple purchase offers calculated in step 512 should be approved. For example, a given purchase offer might have a specific future payment rate. In determining whether to approve the purchase offer, the underwriter system 106 may determine whether the specific future payment rate is within a predetermined range of allowable future payment rates. Generally, each specific financial term included in a given purchase offer is checked to determine whether the specific financial term falls within a predetermined range, and if so, then the given purchase offer is approved. If one or more of the specific financial terms included in a given purchase offer do not fall within their respective allowable ranges, then the given purchase offer is rejected. In some embodiments, the specific financial terms in a given purchase offer may be weighted such that the given purchase offer may be approved even if one or more of the specific financial terms included in the given purchase offer are not approvable, i.e., the one or more specific financial terms are outside of their respective allowable ranges. In generality, the specific financial terms of a given purchase offer may be considered "offer-parameters," or indices, and if the "offer parameters"/indices are within predetermined "allowable ranges" then the purchase offer may be approved.

If none of the purchase offers calculated in step 512 are approved, the process ends at step 520. On the other hand, if one or more of the calculated purchase offers are approved, then the process continues at step 516. In step 516, the underwriter system 106 provides the dealer system 102 with approved purchase offers all at the same time. The provided offers are received and able to be reviewed and selected by the dealer. In step 518, the underwriter system receives the dealer's selection. The dealer's selection may include specifying which purchase offer the dealer has selected or notification that the dealer has rejected all of the purchase offers by either allowing all offers to expire or affirmatively rejecting all offers.

In some embodiments, a purchase offer score is assigned to the initial purchase offer that was calculated in step 508. The purchase offer score may be initially based upon the credit rating of the customer. The purchase offer score may be related to an advance payment rate for the dealer. In step 510, the purchase offer score may be readjusted based upon product information and/or transaction information. For example, based upon the product information, which may include vehicle type, mileage on vehicle, year of vehicle, trim of vehicle, etc., the purchase offer score may be readjusted up or down by a first predetermined maximum amount. Similarly, in step 510, based upon the transaction information, which may include sale price, down payment amount, dealer cost, debt instrument amount, term of debt instrument, outstanding balance, interest rate, etc., the purchase offer score may be readjusted up or down by a second predetermined maximum amount.

In some embodiments, in step 512, one or more purchase offers are calculated based upon the readjusted purchase offer score. For example, if the purchase offer score is related to an advance payment rate for the dealer, and if the purchase offer score is above a first given value such as X1, then the multiple purchase offers are calculated with decreasing advance payment rates, which may decrease by a first predetermined amount of Y1%. However, assuming that the purchase offer score is related to the advance payment rate for the dealer and the purchase offer score is above second predetermined value such as X2, then the multiple purchase offers are calculated with decreasing advance payment rates, which may decrease by a second predetermined amount of Y2%. And, in step 514, each one of purchase offers is approved or disapproved, and for a given purchase offer the purchase offer may be approved or disapproved based upon the advance payment rate contained in the given purchase offer. If the advance payment rate falls outside of a given range, the given purchase offer may be disapproved. In some embodiments, the acceptable range of advance payment rates extends between 41% and 75%, approximately.

Figure 6:
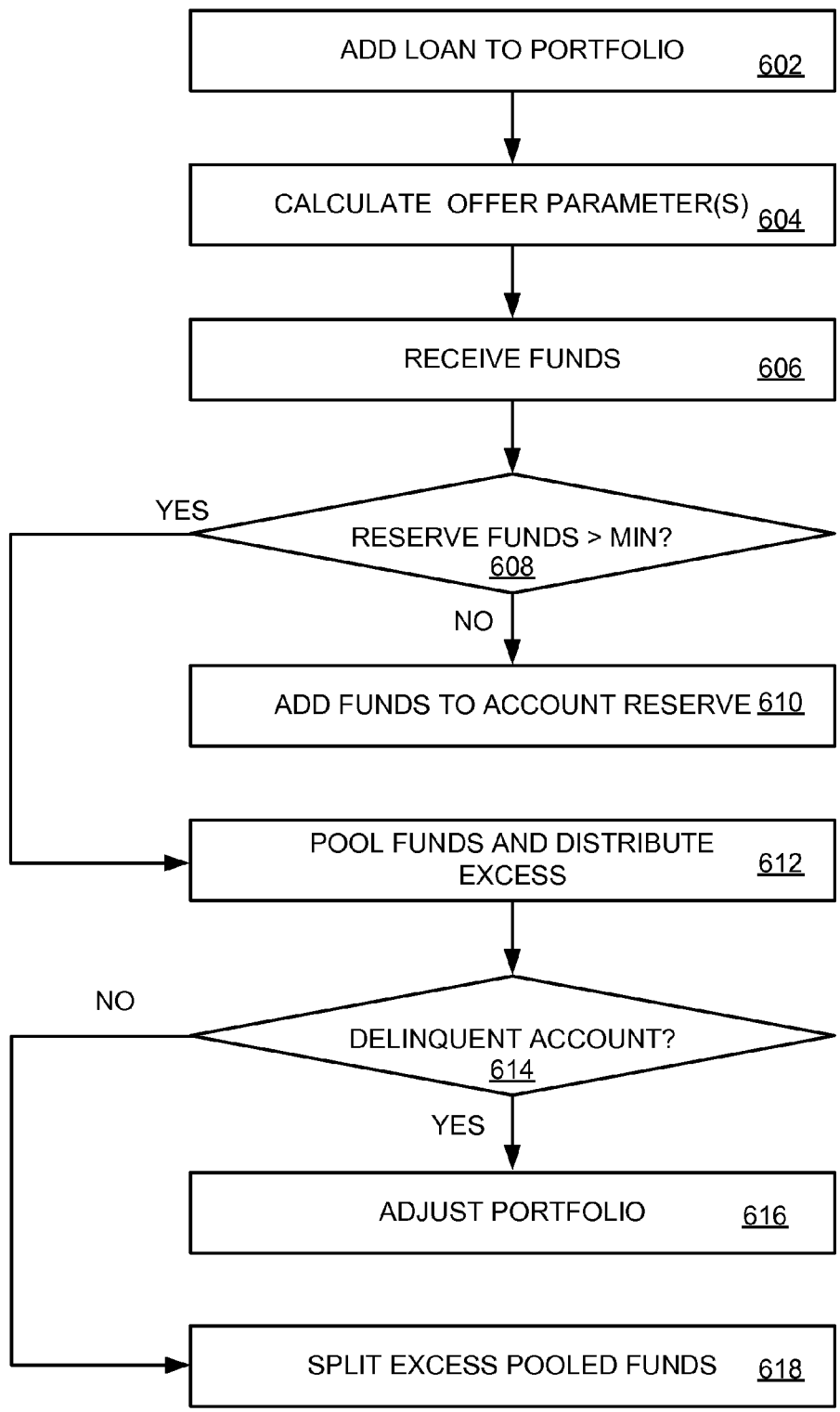
FIG. 6 is a flow chart illustrating one example of the steps taken for managing an account portfolio.

Referring to FIG. 6, which illustrates one example of the steps taken to manage an account portfolio, in step 602, after purchasing a debt instrument from the dealer, the debt instrument is added to an account portfolio. The ARPM module 220 may be configured to add the debt instrument to a presently open account portfolio 222 or open a new account portfolio.

In step 604, the ARPM module 220 calculates portfolio offer parameters for the account portfolio. The portfolio offer parameters may include weighted future payment rates and/or weighted advance payment rates. The portfolio offer parameters may be used in allocating funds to the dealer associated with the account portfolio.

In step 606, repayment funds for one of the debt instruments included in the account portfolio are received. In step 608, the ARPM module 220 determines whether a reserve fund of the account portfolio is greater than a predetermined reserve amount. Typically, the predetermined reserve amount has been previously negotiated by an underwriter and the dealer. If the reserve fund of the account portfolio is less than the predetermined reserve amount, then in step 610, the received funds are added to a reserve fund of the account portfolio. On the other hand, if the reserve funds of the account portfolio are greater than or equal to the predetermined reserve minimum, then the funds received in step 606 are included in a portfolio of distributable funds 612.

In step 614, the ARPM module 220 determines whether any of the debt instruments included in the portfolio account are delinquent. If so, then in step 616, the ARPM module 220 adjusts the portfolio. Among other things, the ARPM module 220 may provide the dealer the following options:
1. Waive interest accrued on payoff balance from date of last payment;
2. Apply the reserve accumulated since the date of debt instrument on the individual asset being repossessed;
3. Allow the dealer to pay a predetermined amount to re-purchase the debt instrument, and thereby gain the right to repossess the product; and
4. Allow the dealer to re-purchase the debt instrument by paying a percentage of the amount due on the debt instrument, and thereby gaining the right to repossess the product.

In step 618, excess pooled funds, i.e., funds included in the account portfolio beyond the minimum reserve, are split with the dealer. In some embodiments, the excess funds are split according to the weighted future payment rate of the account portfolio.

To further illustrate various aspects of the present invention, a particular non-limiting example is presented. In the example, a portfolio is established with a fixed value—assumed to be $150,000. As debt instruments are purchased by the underwriter, the value of the $150,000 portfolio is decreased by the total value of the debt instrument. For instance, if the dealer sells a car for $25,000 and receives a down payment of $5000, then the debt instrument associated with that purchase is $20,000 and if the debt instrument is purchased, the portfolio would decrease to $130,000. Thus, a single portfolio will support multiple debt instruments. Generally, the portfolios are established to support a fixed value.

For each debt instrument or financial transaction that is included in the portfolio, the debt instrument will include an amount that was advanced to the dealer and a percentage of the future payments received that will potentially go to the dealer. The actual value of these two parameters are selected by the underwriter, which can be comprised of a person, a system, a model, a group, etc., and presented to the dealer in multiple packages. Thus, the dealer has the ability to choose the exact values from a limited list of values. The packages may all be simultaneously displayed or a subset may be displayed with the ability to scroll, select, drop down menu, or otherwise access the remaining packages. Each such package is an actual offer that can be accepted by the dealer. As a specific example, the dealer may be presented with three options to select from, with each option having a different advance value and a different future payment percentage. Although the debt instrument is shared between the dealer and the underwriter, the underwriter actually owns the contract and performs/processes the collections. In one embodiment, a portfolio value can be selected and then debt instruments can be purchased up to the portfolio size or within a threshold of the portfolio size. In another embodiment, debt instruments can simply be purchased and then cut off once the aggregate value of the debt instruments is equal to a desired value. For instance, if the underwriter opens a $200,000 portfolio, the underwriter can purchase debt instruments that sum up to this value. Once the funds for the portfolio are exhausted, the portfolio is closed and another portfolio can be opened. However, it will also be appreciated that multiple portfolios may be opened at the same time and that additional portfolios may be opened or initiated at anytime. Each portfolio is independent—not cross-collateralized. Advantageously, this aspect of the present invention helps to alleviate risk on the part of the underwriter since each of the portfolios is separately managed for profitability.

Figure 7:
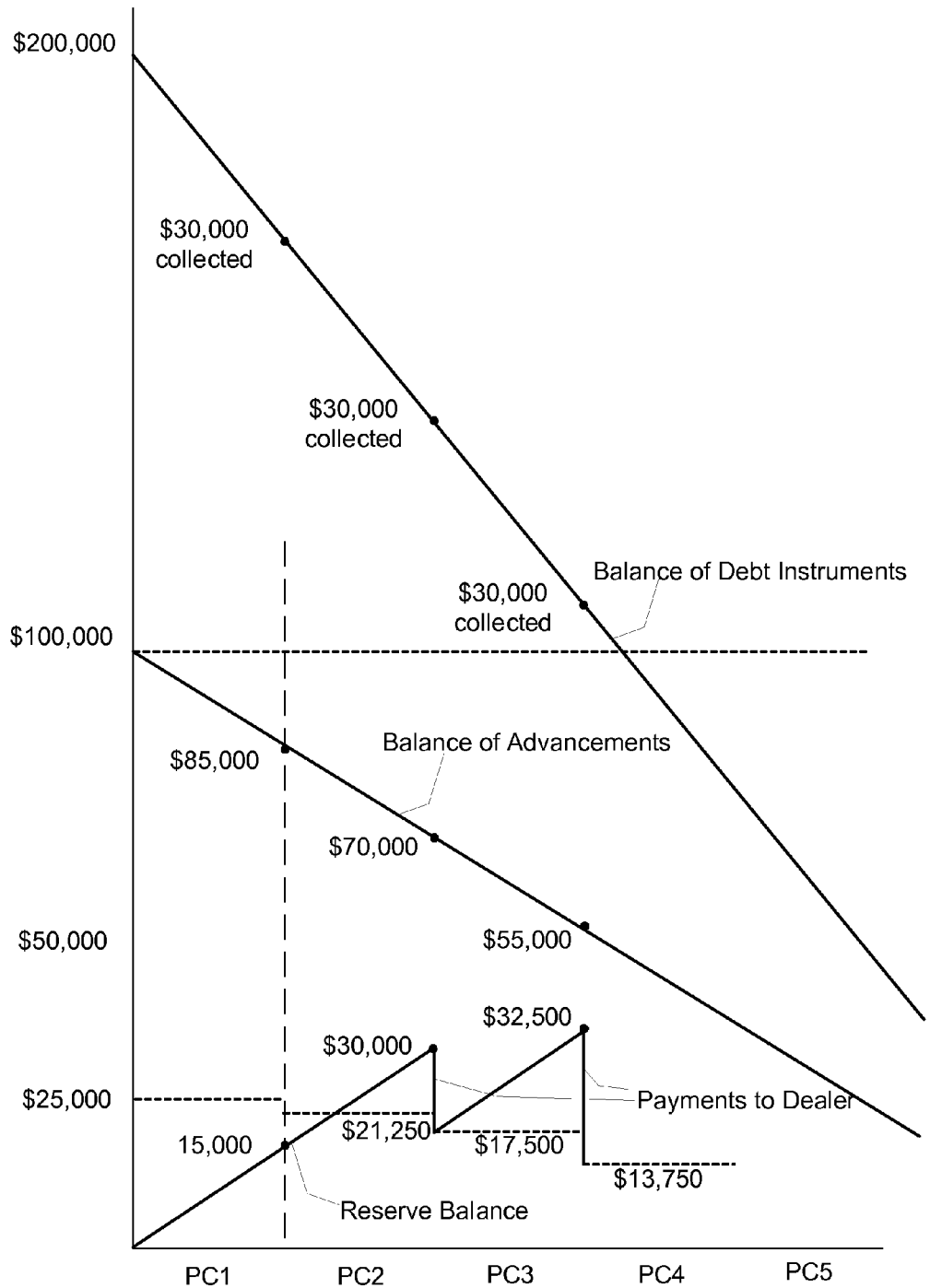
FIG. 7 is a graph showing an example of one embodiment of the operation for allocation of funds collected.

The value of the portfolio is based on the entire amount that is financed—including the amounts that are advanced to the dealer. FIG. 7 is a graph illustrating the manner in which the portfolio is paid down and the collections are allocated in a specific example of the operation of one embodiment of the present invention. In the illustrated example, the portfolio is initially set at $200,000 and the total amount of funds advanced to the dealer is $100,000, or 50% of the portfolio. As payments are received for the various debt instruments in the portfolio, the dollars are apportioned based on the percentage allocation of the future payments subjected to the maintenance of a reserve. In the various embodiments, a reserve that is a percentage of the advanced dollars is collected prior to distributing further funds to the dealer. For instance, in the illustrated embodiment, a reserve of 25% of the funds advanced to the dealer is shown at the value of $25,000. For each payment that is received during a particular period of time, the funds are allocated to the reserve based on the future payment percentage that is due the dealer. Assuming for a first debt instrument that the dealer receives 45% of the future payments, then a $400 payment would result in decreasing the outstanding balance of the dealer advanced amount by $220 (55% of $400) and would increase the reserve by $180 (45% of $400). This is similarly allocated for each of the debt instruments at the associated future percentage value for period of time—typically a payment cycle such as a month.

At the end of a payment cycle, the reserve value is recalculated in view of the collected funds and the current balance of the outstanding advances. If there are excess funds in the reserve after recalculation, these funds are distributed to the dealer and payments received during the next payment cycle will be placed into the reserve. However, if the reserve has not been met, then no payment will be made and the funds will continue to accumulate over the next cycle into the reserve. For the example illustrated in FIG. 7, after the conclusion of the first payment cycle PC1, $30,000 has been collected in total. If we assume that the average of the amount to go to the dealer comes out to 50%, then $15,000 of the $30,000 is allocated to the reserve and the other $15,000 is used to reduce the outstanding advance balance down to $85,000. At the end of the first payment cycle PC1, the reserve value is recalculated based on the reduction of the outstanding advance balance. In the illustrated example, this reduces the reserve value to $21,250 (25% of $85,000). Because the total reserve collected thus far is only $15,000, the threshold has not been reached and thus, there is no distribution made to the dealer.

During the next payment cycle PC2, assume that the same amount of payments are collected, namely $30,000. Again, the average allocation for these funds is assumed to be 50% for the dealer. Thus, during the second payment cycle PC2 the reserve builds up to $30,000 and the outstanding advance balance is reduced to $70,000. When the reserve is recalculated based on the outstanding advance balance of $70,000 at the end of second payment cycle, the reserve value is $17,5000. Because the current balance in the reserve fund is $30,000, $12,500 ($30,000 minus $17,500) of this is distributed to the dealer.

During the third payment cycle PC3, the payments are again accumulated into the reserve. At the end of the third payment cycle PC3, assuming again that $30,000 was collected during the payment cycle, the funds paid out to the dealer at the end of the third payment cycle PC3 is equal to $18,750 (the balance of $32,500 minus the new minimum reserve of $13,750). This process continues until the balance in the advancements, the total value of the portfolio and the reserve limit all converge simultaneously at zero. The example provided of course is simplistic and an actual implementation must take other variables into account. For instance, if some of the payments are not collected for a given period of time, the payments may be written off as bad debt. In one embodiment of the invention, at the end of the payment cycle the reserve is adjusted to account for bad debt. For instance, at the end of payment cycle three in FIG. 7, if $5000 is considered bad debt, then the dealer, rather than receiving $18,750 would only receive $13,750.

Another aspect of the present invention is that embodiments operate to provide a constant yield to the underwriter. When the underwriter prepares the one or more offers to be sent to the dealer, the underwriter selects a desired yield or a percentage rate that defines the underwriter's margin of return. However, the dealer is provided with a level of flexibility in selecting the annualized percentage rate (APR) that is going to be attached to the debt instrument. For instance, the underwriter establishes a range of interest rates from which the dealer can select. The underwriter identifies a percentage rate floor that defines the underwriter's yield. When the offers are presented to the dealer, the dealer can augment the offer to the customer by increasing the APR attached to the debt instrument. Such an action will result in increasing the profitability for the dealer but will not have any affect on the underwriter's profitability. Advantageously, this aspect of the present invention allows a higher degree of automation in the process. For instance, because the dealer had a range of interest rates from which he can select (i.e., a typical range may be 20 to 22 percent in one embodiment), the dealer does not have to call the underwriter to tweak the offers based on a higher or lower interest rate being applied. Because the underwriter receives a constant yield, the dealer can increase or decrease his profitability by changing the APR. In application, the yield rate can be fixed on a state-wide basis or a regional basis and among other things, may take into consideration legal interest rates authorized by the governing authorities for the states or regions.

It should be understood that any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A method for providing a financing service, the method comprising the steps of:

an underwriter computer system receiving from a dealer computer system via a communications network an offer-to-sell a debt instrument associated with a dealer financing of a customer purchase of a product and specifying a down payment and a payment schedule of future payments, the offer-to-sell comprising information about the customer's capacity to make the future payments, collateral for the debt instrument, and credit worthiness of the customer;

the underwriter computer system determining a credit score based on the information in the offer-to-sell received from the dealer;

the underwriter computer system determining to purchase the debt instrument based on the credit score and the information in the offer-to-sell;

the underwriter computer system establishing an account portfolio associated with the dealer;

the underwriter computer system simultaneously providing to the dealer computer system via the communications network a plurality of offers for purchasing the debt instrument from the dealer, each offer including unique purchase offer parameters comprising at least a unique advancement amount specifying an advance amount to pay the dealer upon acceptance of the offer and a unique sharing percentage specifying a percentage of the future payments that the underwriter will share with the dealer from the account portfolio, and each offer is based at least in part on at least a portion of the information in the offer-to-sell received from the dealer computer system;

the underwriter computer system receiving from the dealer computer system via the communications network an acceptance of one of the plurality of offers; and the underwriter computer system incorporating the debt instrument and the associated unique purchase offer parameters into the account portfolio stored in a database, the account portfolio comprising a plurality of previously-purchased debt instruments associated with the dealer, wherein the account portfolio comprises an initial fixed value which is decreased by the value of incorporated debt instruments.

2. The method of claim 1, wherein the offer-to-sell further comprises demographic information pertaining to the customer, and the plurality of offers for purchasing the debt instrument from the dealer are based on the demographic information.

3. The method of claim 2, wherein the demographic information includes the state of the customer and the plurality of offers comprises a constant yield based on an interest rate identified for the particular state.

4. The method of claim 2, wherein the credit score is determined based on a proprietary algorithm.

5. The method of claim 2, wherein the credit score is based on a credit report generated by a credit bureau.

6. The method of claim 5, wherein the account portfolio is closed when a plurality of financial transactions summing to a value within a threshold of the portfolio value have been incorporated.

7. The method of claim 6, wherein as payments are collected on the debt instruments in the portfolio, funds are accumulated to meet a minimum reserve value.

8. The method of claim 6, wherein as payments are collected on the debt instruments in the portfolio, funds are accumulated to meet a reserve value calculated to be a percentage of the total amount of advanced funds represented by the debt instruments in the portfolio.

9. The method of claim 6, wherein as payments are collected on the debt instruments in the portfolio, funds are accumulated to meet a minimum reserve value calculated to be a percentage of the total amount of advanced funds outstanding at the end of a payment cycle and once the reserve is met, allocating funds from the reserve to the dealer down to the minimum reserve value.

10. The method of claim 6, wherein as payments are collected on the debt instruments in the portfolio, funds are accumulated to meet a minimum reserve value calculated to be a percentage of the total amount of advanced funds represented by the debt instruments in the portfolio and further comprising the steps of: at the end of a payment cycle, recalculating a new minimum reserve value based on the present value of the outstanding balance of the advanced funds; if the funds in the reserve exceed the new minimum reserve value, distributing those funds that exceed the new minimum reserve value; and if the funds in the reserve do not exceed the new reserve value, continue collecting payments for the next payment cycle.

11. The method of claim 6, wherein as payments are collected on the debt instruments in the portfolio, funds are accumulated to meet a reserve value calculated to be a percentage of the total amount of advanced funds represented by the debt instruments in the portfolio and further comprising the steps of: at the end of a payment cycle, recalculating the reserve value; if the funds in the reserve exceed the new reserve value, distributing those funds in excess of the new reserve value; and if the funds in the reserve do not exceed the new reserve value, continue collecting payments for the next payment cycle.

12. A method for providing a financing service, the method comprising the steps of:

an underwriter computer system receiving from a dealer computer system via a communications network an offer-to-sell to an underwriter a debt instrument associated with a dealer financing of a customer purchase of a product from the dealer, the debt instrument specifying a down payment and a payment schedule of future payments, the offer-to-sell comprising information about the customer's capacity to make the future payments, collateral for the debt instrument, credit worthiness of the customer, and a down payment made to purchase;

the underwriter computer system determining a credit score based on the information in the offer-to-sell received from the dealer;

the underwriter computer system determining to purchase the debt instrument based on the credit score and the information in the offer-to-sell;

the underwriter computer system simultaneously providing to the dealer computer system via the communications network a plurality of offers for purchasing the debt instrument from the dealer, each offer including unique purchase offer parameters comprising at least a unique advancement amount specifying an advance amount to pay the dealer upon acceptance of the offer by the dealer and a unique sharing percentage specifying a percentage of the future payments that the underwriter will share with the dealer from an account portfolio, and each offer is based at least in part on at least a portion of the information in the offer-to-sell received from the dealer computer system;

the underwriter computer system receiving from the dealer computer system via the communications network an acceptance of one of the plurality of offers;

the underwriter computer system incorporating the debt instrument and the associated unique purchase offer parameters into the account portfolio stored in a database, the account portfolio comprising a plurality of previously-purchased debt instruments associated with the dealer, wherein the account portfolio comprises an initial fixed value which is decreased by the value of the incorporated debt instruments;

receiving the future payments from the customer; and the underwriter sharing the future payments with the dealer according to the unique sharing percentage.

\* \* \* \* \*